United States Patent
Torbitt

(10) Patent No.: US 9,989,190 B2
(45) Date of Patent: Jun. 5, 2018

(54) TRIPOD FOR SUPPORTING A VIDEO CAMERA

(71) Applicant: The Vitec Group PLC, Richmond (GB)

(72) Inventor: Jolyon Francis Torbitt, Suffolk (GB)

(73) Assignee: The Vitec Group PLC, Suffolk (GB)

( * ) Notice: Subject to any disclaimer, the term of this patent is extended or adjusted under 35 U.S.C. 154(b) by 14 days.

(21) Appl. No.: 15/521,132

(22) PCT Filed: Jul. 15, 2015

(86) PCT No.: PCT/GB2015/052033
§ 371 (c)(1),
(2) Date: Apr. 21, 2017

(87) PCT Pub. No.: WO2016/062997
PCT Pub. Date: Apr. 28, 2016

(65) Prior Publication Data
US 2017/0314729 A1    Nov. 2, 2017

(30) Foreign Application Priority Data
Oct. 21, 2014  (GB) .................................. 1418682.9

(51) Int. Cl.
| F16M 11/32 | (2006.01) |
| F16M 11/14 | (2006.01) |
| F21V 33/00 | (2006.01) |
| G03B 15/03 | (2006.01) |
| G03B 17/56 | (2006.01) |
| G03B 15/02 | (2006.01) |
| F21Y 115/10 | (2016.01) |

(52) U.S. Cl.
CPC ............. *F16M 11/32* (2013.01); *F16M 11/14* (2013.01); *F21V 33/008* (2013.01); *G03B 15/02* (2013.01); *G03B 15/03* (2013.01); *G03B 17/561* (2013.01); *F21Y 2115/10* (2016.08)

(58) Field of Classification Search
CPC .............................. F16M 11/32; F21V 33/008
See application file for complete search history.

(56) References Cited

U.S. PATENT DOCUMENTS

| 4,648,697 A | 3/1987 | Kawazoe |
| 5,404,280 A | 4/1995 | Greek |
| 9,464,753 B2 * | 10/2016 | Mayer .................. F16M 11/126 |
| 2005/0089323 A1 | 4/2005 | Chapman et al. |

(Continued)

FOREIGN PATENT DOCUMENTS

| CN | 200947153 | 9/2007 |
| EP | 10096997 | 4/1998 |

(Continued)

OTHER PUBLICATIONS

Yang, CN200947153, "Tripod" Description translated into english.*

*Primary Examiner* — Clayton E Laballe
*Assistant Examiner* — Linda B Smith
(74) *Attorney, Agent, or Firm* — Pepper Hamilton LLP

(57) ABSTRACT

A tripod (1) for supporting a video camera includes a head element (4) and a plurality of supporting legs (2), whereby each leg (2) is attached at one end to the head element (4). The tripod includes an illumination means (6) which is arranged to illuminate a space beneath said head element (4).

13 Claims, 2 Drawing Sheets

(56) References Cited

U.S. PATENT DOCUMENTS

2009/0141473 A1* 6/2009 Chuang ............... F16M 11/242
                                                    362/9
2009/0229160 A1* 9/2009 Elliott .................... F41A 23/04
                                                    42/73
2010/0237263 A1   9/2010 Walesa

FOREIGN PATENT DOCUMENTS

EP          2787270 A1   10/2014
JP          H10096997     4/1998

* cited by examiner

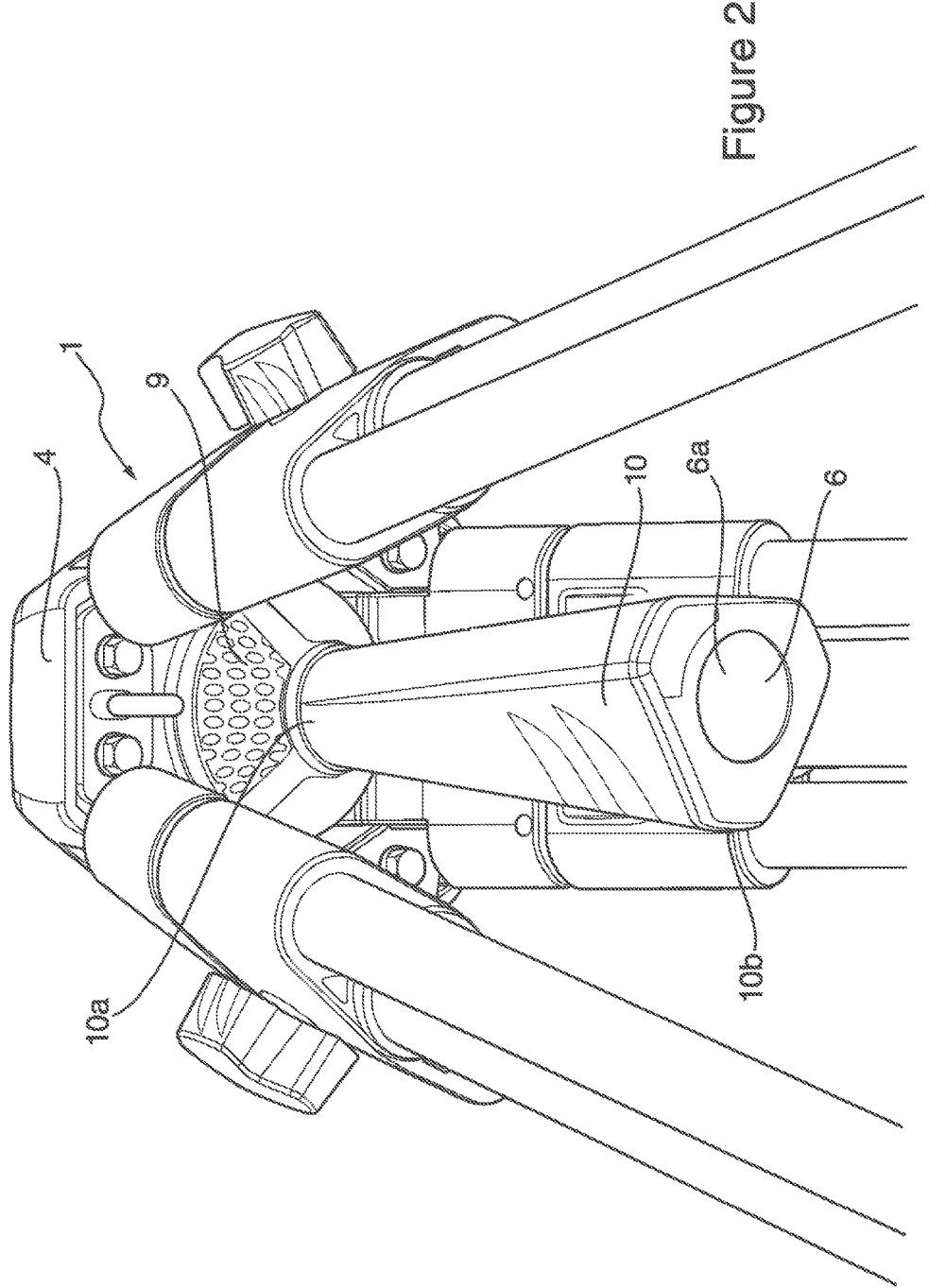

TRIPOD FOR SUPPORTING A VIDEO CAMERA

CROSS REFERENCE TO RELATED APPLICATIONS

This application is a National Phase of PCT Patent Application No. PCT/GB2015/052033 filed Jul. 15, 2015, which claims priority to Great Britain Application No. 1418682.9 filed Oct. 21, 2014, which is incorporated herein by reference in its entirety.

FIELD OF THE INVENTION

The invention relates to a tripod for supporting a camera, and in particular a tripod supporting a video camera incorporating an illumination device.

BACKGROUND TO THE INVENTION

It is known that when a tripod user (e.g. a camera man) attempts to adjust a tripod in a poorly lit area, the user cannot observe any of the adjustment means for adjusting the tripod. Therefore, the user has to literally feel their way around the tripod to make the necessary adjustments. Furthermore, when the tripod is used in a room which is densely populated by people, e.g. a news conference, the feet of the tripod cannot be observed by the camera user or other people. This could result in the tripod being kicked or knocked over, and the risk of the supported camera being damaged, or somebody getting hurt.

Furthermore, the cameraman often has to use a handheld torch in order to find equipment and accessories for their work in the dark.

The purpose of the claimed invention is to solve at least some of these problems.

SUMMARY OF THE INVENTION

In a first broad independent aspect, the invention provides a tripod for supporting a video camera, the tripod comprising a head element and a plurality of supporting legs, whereby each said leg is attached at one end to said head element, characterised in that said tripod comprises an illumination means, whereby said illumination means is arranged to illuminate a space beneath said head element.

This configuration is advantageous because it illuminates the working area of the tripod, (e.g. the area beneath the head element of the tripod). This illumination makes it easier for the tripod user to observe and use the mechanism(s) required for setting up and adjusting the tripod in an area which is poorly lit, or overshadowed by other users in a densely populated room (e.g. a news conference room). Furthermore, the illumination beneath the head element of a tripod does not radiate any unintentional light towards the target, which is to be filmed by the camera mounted upon the tripod and cause a possible distraction to the target and/or other people/objects within the room. Furthermore, the cameraman can place their ancillary equipment or bags in the illuminated area under the tripod so that they can see to locate or use the ancillary equipment.

Preferably, said illumination means is arranged to illuminate a ground engaging element of each said leg. This enables the tripod user to observe the ground engaging element(s) of each leg in a poorly lit area. The illumination prevents the user, or any other person from unintentionally kicking/impacting a tripod leg, which could result in the tripod and supported camera being knocked over and damaged.

Preferably, wherein said head element further comprises a bowl clamp element for positioning a supported video camera on said tripod; whereby said bowl clamp further preferably comprises an adjustment element of said bowl clamp and said adjustment element is adapted to comprise said illumination means. This configuration enables the illumination means to be incorporated within the existing components of a bowl clamp element of the tripod. Therefore, this configuration reduces the number of external components required for installing the illumination means on to the head element of the tripod and prevents any obstruction to the movement(s) of the tripod user during the use of the tripod. Furthermore, by reducing the number of required components for the head element, the weight of the head element is also subsequently reduced.

Preferably, said adjustment element comprises a portion extending into said space beneath said head element; whereby said portion is adapted to comprise said illumination means. This enables the illumination means to extend from the bowl clamping element into the working area of the tripod. Therefore, the illumination means is then supported in a position where the light is only radiated into the working area of the tripod.

More preferably, said illumination means further comprises an adjustable element, whereby said adjustable element facilitates an illumination adjustment of said space beneath said head element. This configuration enables adjustment of the illumination means to facilitate the illumination of a space in or outside the working area of the tripod, which is required by the tripod user.

Preferably, said illumination means is a Light Emitting Diode (LED). The LED provides an illumination means which requires a small amount of electrical power when compared against other alternatives, such as halogen and filament based lighting device. Therefore, the use of LEDs substantially increases the operating time of the illumination when powered from a remote power supply (e.g. a battery). Also, the operation of the LED generates little heat when compared to other alternatives such as halogen and filament based lighting device. Therefore, the use of LEDs is substantially cooler, which reduces the heating of tripod about the LED.

Preferably, said illumination means further comprises a red-light emitting means. The red light enables the user of the tripod to have an effective low light vision, which is suitable for observing the adjustment(s) of the tripod within the illuminated area.

Preferably, said illumination means further comprises a light beam selection means for selecting a beam configuration of a light energy radiated from said illumination means. This enables the illumination means to radiate light comprising different projected perimeters (i.e. different shapes to a circle of light), different colours in combination and different shapes (in shadow or different colours) to illuminate specific areas.

Preferably, said illumination means further comprises a communication means for communicating a message from said illumination means. This will enable such projected images to display status of equipment, operation assistance text or to act as a communication means to the cameraman (e.g. tally, stage directions, logos, brand images etc—fixed or moving).

Preferably, said head element further comprises a body element, whereby said body element is adapted to comprise said illumination means. This configuration provides a head element which has been adapted to radiate light from the illumination means within the head element, into the working space of the tripod.

Preferably, a said leg is adapted to comprise said illumination means. This configuration provides a leg which has been adapted to radiate light from the illumination means within the leg, into the working space of the tripod.

In a second broad independent aspect, the invention provides a head element for a camera-supporting tripod which facilitates the attachment of a plurality of supporting legs, characterised in that said head element is adapted to comprise an illumination means, whereby said illumination means is arranged to illuminate a space beneath said head element. This configuration provides a head end element incorporating an illumination device which can be built into a new tripod, or retrospectively fitted to an existing tripod.

In a third broad independent aspect, the invention provides a bowl clamp for positioning a supported video camera on a tripod, characterised in that said bowl clamp comprises an adjustment element, whereby said adjustment element is adapted to comprise said illumination means. This configuration provides a bowl clamp incorporating an illumination device which can be built into a new tripod, or retrospectively fitted to an existing tripod.

BRIEF DESCRIPTION OF THE FIGURES

FIG. 2 shows a bottom perspective view of the illuminated tripod.

DETAILED DESCRIPTION OF THE FIGURES

Figure 1:
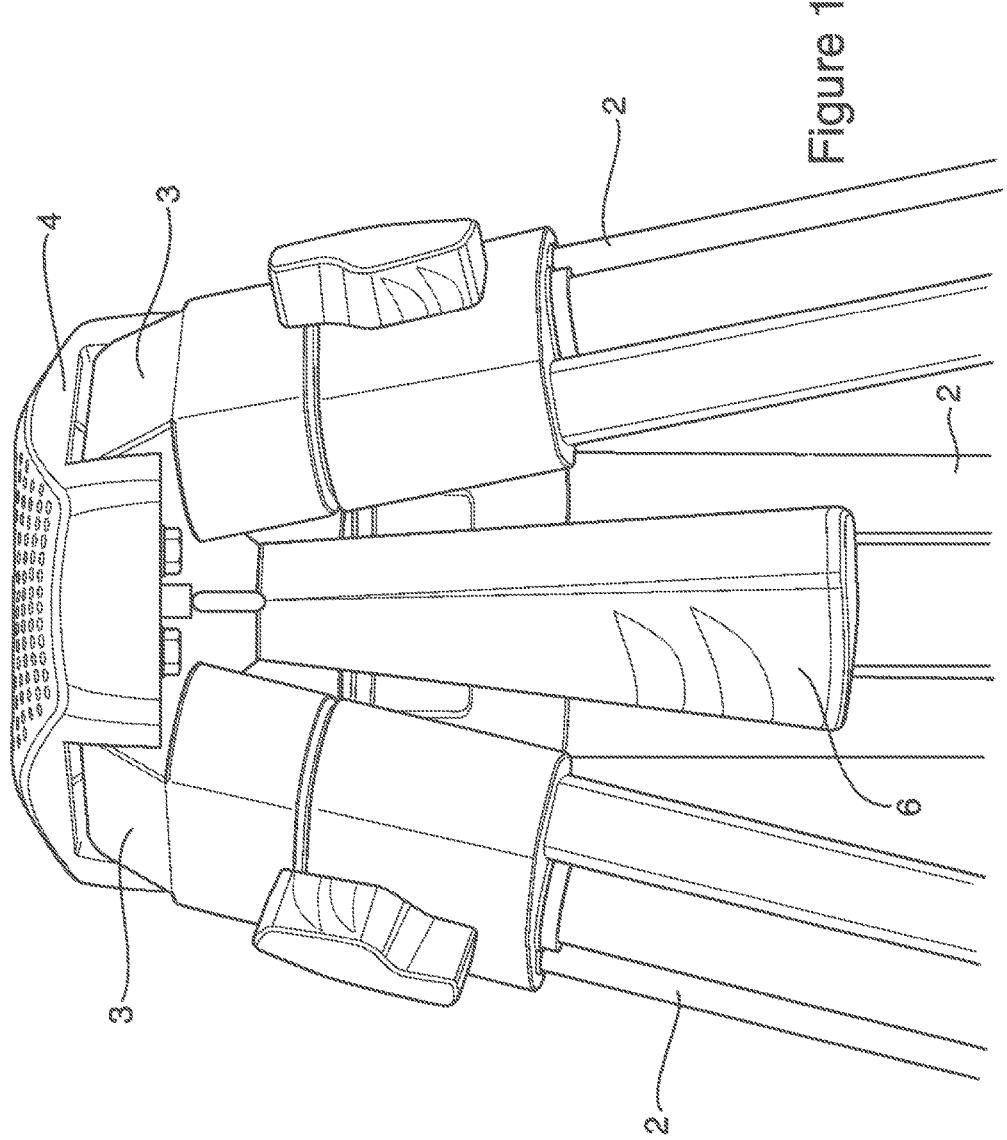
FIG. 1 shows a side perspective view of an illuminated tripod.

FIG. 1 shows a perspective side view of an illuminated tripod, which is generally indicated by 1. The tripod incorporates three supporting legs 2 and each supporting leg incorporates a pivotable attachment 3, which attaches each leg 2 to an upper head element 4 of the tripod 1. An illumination device 6 emits a light into a working area [not shown], which is an area located between the legs 2 of the tripod 1. The illumination device 6 also illuminates the surface area of the ground located between each ground engaging element of each leg 2. The illumination device 6 emits visible radiation, which is in the visible region of the electromagnetic spectrum, and is typically within the visible red region.

FIG. 2 shows a perspective bottom view of the illuminated tripod 1. The head element 4 of the tripod 1, incorporates the illumination device 6 centrally located underneath the head element 4. The illumination device 6 is, in the preferred illustrated embodiment, incorporated in the adjustment knob 7 of a bowl clamp element or device 9 centrally located within the head element 4. The bowl clamp device 9 is substantially hemi-spherical and incorporates a round control portion, which cooperates with the adjustment knob 7. Therefore, the adjustment knob 7 is also known as a bowl clamp tie device. In an alternative embodiment, not illustrated, the illumination device is incorporated in another element of the tripod 1 such as a leg 2.

The adjustment knob 7 incorporates an elongate body 10, which extends into the working area beneath the head element 4. The body 10 incorporates a taper, which incorporates a small circular end 10a that cooperates with the round central portion of the bowl clamp device 9. The body 10 then increases in diameter, linearly along the length of the body 10, towards the larger opposite end 10b. The body 10 extends from the bowl clamp device 9 in a linear taper, which increases in diameter along its length. The diameter of the body 10 linearly alters along its length until the body 10 has a triangular cylindrical configuration at the larger opposite end 10b. Each apex of the triangular configuration of end 10b is substantially rounded. Centrally located within the triangular end 10b is the illumination device 6.

The illumination device 6 is of circular configuration and incorporates a lens element 6a. The illumination device 6 is typically a light emitting diode (LED), along with any associated power supply device, such as a battery or capacitor or the like (not shown). An LED device enables the prolonged use of the illumination device, which draws a small amount of electrical current and therefore subsequently prolonging the battery life of the device. In use, the LED device also emits low heat, which is due to its low electrical power consumption and therefore prevents the subsequent heating of the handle adjustment knob itself.

The illumination device 6 is configured so that it emits light beneath the head element 4 of the tripod 1, into the working area located between the legs 2 of the tripod 1.

In use, the adjustment knob of the bowl clamp device incorporates the illumination device and is attached to the bowl clamp via a screw-threaded attachment means. By rotating the adjustment knob (i.e. bulb clamp also referred to as a tie down device), the user can positionally adjust a camera supported by the bowl clamp device.

The position of the adjustment knob also determines the direction of the light radiated from the illumination device, i.e. in a downwards direction from the header element of the tripod, which illuminates the area and the ground beneath the header element and between the legs of the tripod. Or alternatively, the illumination device illuminates an area biased towards one or more legs or an area outside the area contained by the legs.

The tapered cylindrical body incorporates three blunt apices to facilitate the grip of the tripod user, which grip subsequently facilitates providing the rotational movement for either locking or releasing the positional adjustment provided by the bowl clamp device.

The round lens of the illumination device provides a circular illumination of the working area beneath the head element, by emitting a cone of light of increasing diameter away from the head element, that illuminates the ground inbetween and/or around the legs of the tripod. The emitted light is typically either a visible red light, or white light. Red light allows the user to focus their vision on adjusting or setting up the tripod in a poorly lit environment, without impairing their vision in normal lighting conditions. White light allows the user to focus their vision in normal conditions when setting up the tripod in normal light conditions.

The hemispherical shape of the bulb clamp device enables the angular displacement of the adjustment knob, with respect to the bowl clamp device, therefore subsequently providing an angular adjustment of the illumination device beneath the head element of the tripod.

The illumination of the working area beneath the head element of the tripod enables the tripod user to adjust the tripod, or set up the tripod in a poorly lit environment. The poorly lit environment may be a poorly lit room, or an environment which is packed with people, who inadvertently overshadow the tripod. The illumination of the ground within the working area beneath the tripod illuminates the ground engaging feet of each leg, which indicates their presence to other people and prevents them from inadvertently kicking or knocking over the tripod. These heavily populated environments may be in a small room or studio, such as a conference or press release room or booth.

In an alternative embodiment of the invention, not illustrated the illumination device is arranged directly on the bottom surface of the head element of the tripod and is configured to illuminate the working area beneath the head element.

In another alternative embodiment, not illustrated, of the invention, the light is arranged on a leg of the tripod to illuminate the working area beneath the head element of the tripod.

In another alternative embodiment, not illustrated of the invention, the light comprises a means of selecting the colour of the emitted light. This means may be in the form of selecting optical colour filters, selecting a discrete light source for each colour and/or adjusting/tuning a colour adjustable light source to provide the required colour for the emitted light.

In a further unillustrated embodiment of the invention, the tripod includes a communication means to communicate information to the user from the illumination means. This can include such information as the illumination level, the status of the device etc.

The invention claimed is:

1. A tripod (1) for supporting a video camera, the tripod (1) comprising a head element (4) and a plurality of supporting legs (2), whereby each said leg is attached at one end to said head element (4), wherein said head element (4) comprises a body element (10) which extends into a working area beneath the head element (4); whereby said body element (10) is adapted to comprise an illumination means (6), said illumination means (6) being arranged to illuminate a space beneath said head element (4).

2. A tripod according to claim 1, wherein said illumination means is arranged to illuminate a ground engaging element of each said leg.

3. A tripod according to claim 1, wherein said head element further comprises a bowl clamp element for positioning a supported video camera on said tripod.

4. A tripod according to claim 1, wherein said illumination means further comprises an adjustable element; whereby said adjustable element facilitates an illumination adjustment of said space beneath said head element.

5. A tripod according to claim 1, wherein said illumination means is a Light Emitting Diode (LED).

6. A tripod according to claim 1, wherein said illumination means further comprises a red-light emitting means.

7. A tripod according to claim 1, wherein said illumination means further comprises a colour selection means for selecting a colour of a light emitted from said illumination means.

8. A tripod according to claim 1, wherein said illumination means further comprises a light beam selection means for selecting a beam configuration of a light energy radiated from said illumination means.

9. A tripod according to claim 1, wherein said illumination means further comprises a communication means for communicating information from said illumination means.

10. A tripod according to claim 3, wherein the bowl clamp comprises an adjustment element of said bowl clamp and said adjustment element comprises said illumination means.

11. A tripod according to claim 3, wherein said adjustment element comprises a portion extending into said space beneath said head element; whereby said portion is adapted to comprise said illumination means.

12. A head element for a camera supporting tripod which facilitates the attachment of a plurality of supporting legs; wherein said head element comprises a body element which extends into a working area beneath the head element; whereby said body element is adapted to comprise an illumination means, whereby said illumination means is arranged to illuminate a space beneath said head element.

13. A bowl clamp for a head element of a tripod according to claim 1, the bowl clamp for positioning a supported video camera on the tripod; wherein said bowl clamp comprises an adjustment element; whereby said adjustment element is adapted to comprise said illumination means.

* * * * *